Jan. 19, 1943.　　　　C. H. FOSTER　　　　2,308,872
CONVEYING MECHANISM
Filed Sept. 11, 1941　　　2 Sheets-Sheet 1

INVENTOR.
CLAUD H. FOSTER
BY
ATTORNEYS.

Jan. 19, 1943.   C. H. FOSTER   2,308,872
CONVEYING MECHANISM
Filed Sept. 11, 1941   2 Sheets-Sheet 2

INVENTOR.
CLAUD H. FOSTER
BY *Hull & West,*
ATTORNEYS.

Patented Jan. 19, 1943

2,308,872

UNITED STATES PATENT OFFICE 2,308,872

CONVEYING MECHANISM

Claud H. Foster, South Euclid, Ohio

Application September 11, 1941, Serial No. 410,420

7 Claims. (Cl. 198—184)

This invention relates to conveying mechanism and has for its general object to provide a conveying mechanism comprising a conveyor proper of the endless-belt type which is comparatively light, simple of construction, and inexpensive of manufacture, but which is capable of transferring heavy loads without injuries thereto other than such as are due to the ordinary incidents of prolonged service.

A further and more limited object of the invention is to provide a conveying mechanism wherein, in the employment of an endless conveyor belt of considerable longitudinal extent, idler pulleys may be dispensed with.

A further object of the invention is to provide, for a conveyor belt of this type simple, economical and efficient means for supporting the central longitudinal portion of the upper or load-carrying stretch thereof.

A still further object of the invention is to utilize a backbone for such supporting means, with means carried by the belt for engaging the backbone and spacing the upper stretch of the belt therefrom and for also accomplishing efficient lubrication between such engaging and spacing means and the backbone.

A further object of the invention is to provide a conveying apparatus with convenient means whereby the material thereon may be automatically deposited at the desired point of use.

Further and more limited objects of the invention will be pointed out in the description hereof in connection with the drawings and will be set forth in the claims appended hereto.

Figure 1:
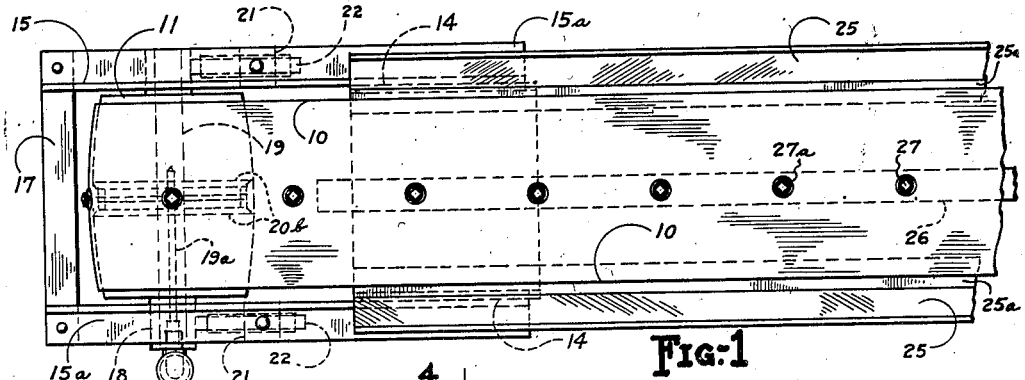
Figure 2:
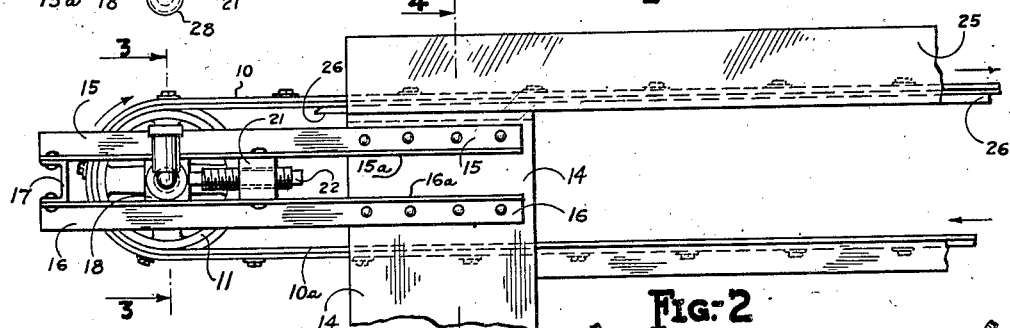
Figure 3:
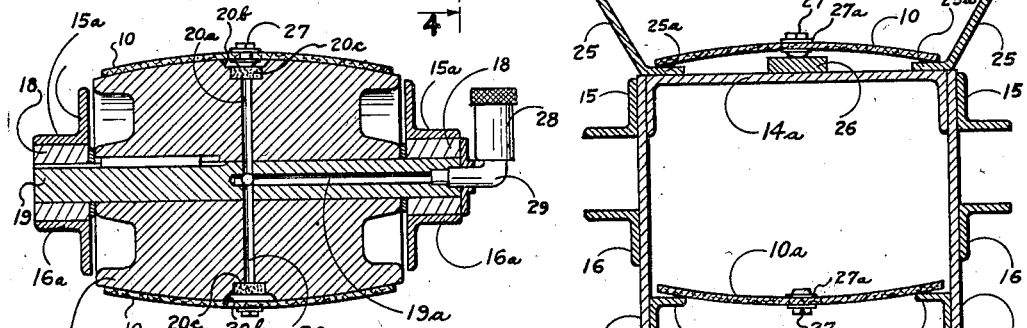
Figure 4:
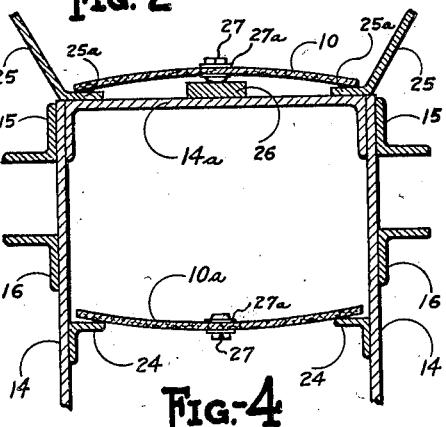
Figure 5:
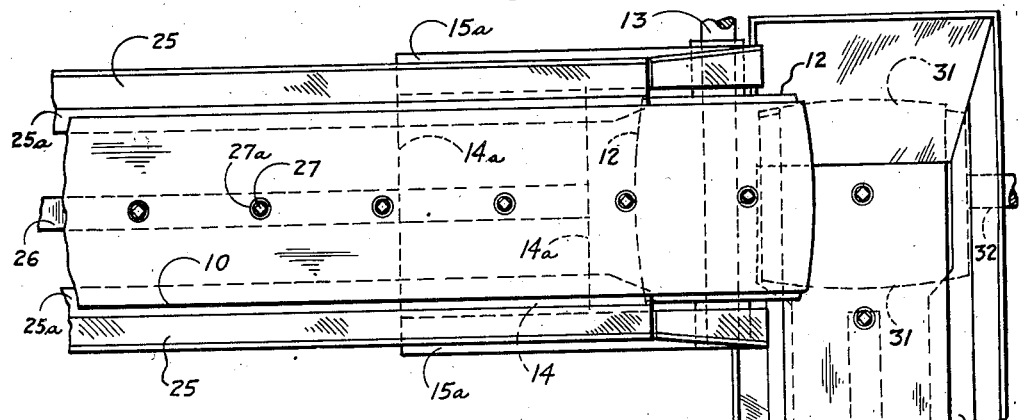

I accomplish the foregoing objects in and through the construction and arrangement of parts shown in the drawings, wherein Fig. 1 represents a plan view and Fig. 2 a side elevation of one of the end portions of a conveying mechanism constructed in accordance with my invention; Figs. 3 and 4 sectional views taken on the lines corresponding respectively to the lines 3—3 and 4—4 of Fig. 2; Fig. 5 a plan view of the opposite end portion of the conveying mechanism shown in Figs. 1 and 2 and of the cooperating delivery conveyor, with the means for discharging therefrom the material received from the former conveying mechanism; and Fig. 6 a detail in section corresponding to the line 6—6 of Fig. 5.

Describing the various parts illustrated herein by reference characters, 10 denotes the upper stretch and 10a the lower stretch of an endless belt, the opposite ends of the same extending around pulleys 11 and 12, one of which pulleys (pulley 12) is mounted on and driven by a shaft 13.

14 denotes vertical supporting members arranged on opposite sides of the conveyor belt, two pairs of such supporting members being indicated in Figs. 1 to 5 and the manner in which these supporting members serve to support the conveyor belt and the parts associated therewith being shown in detail in Figs. 1, 2 and 4.

Referring more particularly to Figs. 1, 2 and 4, 15 and 16 denote vertically spaced angle bars secured to the supporting members 14 and extending forwardly therefrom and having their forward ends spaced apart and connected by the transversely extending channel bar 17. The horizontal flanges 15a and 16a of the bars 15 and 16 provide therebetween supports for journal boxes 18 in which the shaft 19 of the crown pulley 11 is mounted.

21 denotes a nut mounted between and secured to the flanges 15a and 16a, each of said nuts receiving therein an adjusting screw 22 by means of which the journal boxes and the shaft 19 supported thereby may be moved forwardly, thereby to take in the slack of the belt from time to time. The journals for the shaft 13 are supported in the same manner as those for the shaft 19, but no means for moving the said journal boxes will be necessary or desirable. In other respects, the crown pulley 12 over which the rear or delivery portion of the upper stretch of the belt passes is supported in a manner similar to the pulley 11.

24 denotes angle bars secured to the upright supporting members 14 and extending between these members and the like supporting members located adjacent to the rear of the conveying mechanism. The upper ends of the supporting members 14 are connected by a transversely extending top member 14a, preferably integral therewith.

If necessary, one or more additional pairs of supporting members 14, with their respective top members 14a, may be provided between the front and the rear of the conveying mechanism, but, except where the conveyor belt is of unusually great length, no such intermediate supporting members will be necessary, for reasons to be explained hereinafter.

25 denotes upwardly and outwardly flaring trough sides having inturned lower flanges 25a by which they are secured, as by welding, to the top members 14a, it being noted that the side edges of the upper stretch 10 of the endless belt are adapted to rest upon said inturned flanges.

26 denotes a bar, preferably of metal and constituting a backbone for supporting the central portion of the upper stretch of the belt and having its opposite ends supported by the top members 14a at opposite ends of the belt. 27 denotes studs which extend through the longitudinal central portion of the belt and through washers 27a provided on opposite sides of the belt. The lower ends of the studs on the upper stretch of the belt are adapted to ride upon the top of the backbone bar 26. In order to eliminate friction between these studs and the top of the backbone, I have provided the following means for efficiently and economically applying lubricant to the ends of the studs which contact with the bar:

The shaft 19 is provided with a central longitudinal bore 19a extending from one end thereof to, and preferably beyond the longitudinal center of the said shaft. Bores 20a extend radially from the bore 19a to a groove or recess 20b extending around the central portion of the exterior surface of the pulley 11. Within the bottom of this groove or recess there is seated a pad 20c of suitable absorbent material, such as wicking, the pad being located at a sufficient distance from the exterior surface of the pulley to permit the same to be engaged by the ends of the portions of the studs 27 that are located within the inner surface of the belt. 28 denotes a grease cup having a connection 29 whereby lubricant may be supplied to the pad 20c through the bores 19a and 20a.

The studs will be spaced apart a distance which will enable the track which they traverse on the bar 26 to be efficiently lubricated. In actual practice, effective lubrication has been accomplished by spacing the studs about one foot apart with a belt 12 inches wide.

With the parts constructed and arranged as described, it is believed that the operation will be readily understood. Power being applied to the pulley 12 through the drive shaft 13, the belt will be driven in the direction indicated by the arrows on Fig. 2. The articles to be conveyed will be applied to the upper stretch of the belt, within the trough sides 25.

It will be noted that, while the longitudinal central portion of the upper stretch of the belt is supported by the backbone bar 26, through the studs 27, the side edges of the belt are supported by the inturned flange 25a of the trough sides 25. This means for supporting the belt, together with the trough sides, enables a heavy load to be carried by a belt of comparatively light and cheap construction; and the registration of the lower ends of the studs in the upper stretch of the belt with the groove 20b and the pad 20c will insure adequate lubrication between the studs and the backbone bar.

Figure 6:
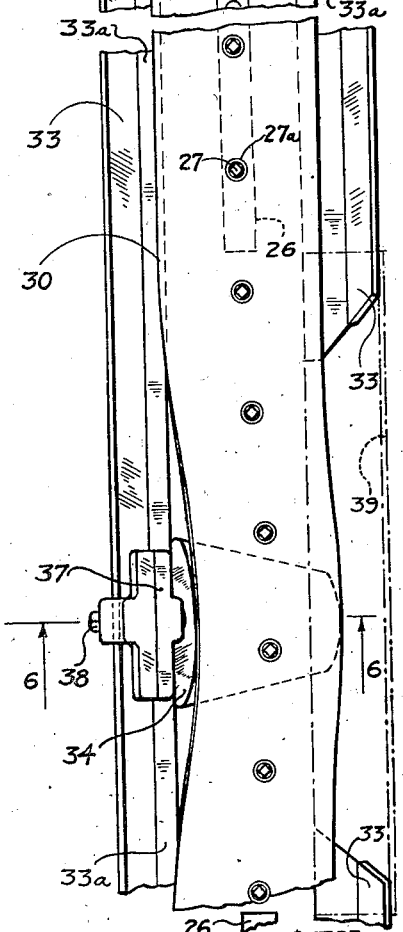

The rear or delivery end of the belt overlaps the receiving end of a take-off endless belt, the upper stretch of which is indicated at 30, see Fig. 5, and the lower stretch at 30a, see Fig. 6. The front or receiving end of the latter belt extends around a crown pulley 31, the shaft 32 of which may be supported in suitable journals in the same manner as shown and described in connection with the journals of the pulley 11.

One of the side edges of the upper stretch of the belt 30 is provided preferably throughout its length with a trough side 33 having its lower flange 33a directed inwardly beneath the adjacent edge of the belt, as is the case with the trough sides 25, 25a. The opposite side of the upper stretch of the belt is also provided with a similar trough side 33, 33a, preferably extending uninterruptedly from the receiving end of the belt to the point or points at which delivery of the load on the belt is to be effected. At each such point the second trough side will be cut away, as indicated in Fig. 5, and a tapered or conical pulley 34 will be supported by the opposite continuous trough side, the said pulley being mounted on a shaft 35 which is preferably inclined downwardly toward the side of the belt from which the load is to be discharged. The shaft 35 may be conveniently supported in a bracket 37 adapted to be slidably mounted on top of the continuous trough side 33, the bracket being provided with a set screw 38 whereby the pulley may be secured in register with any one of the dumping openings provided in the other trough side.

Where it is desired to provide means for dumping material in several places along the length of the belt 30, the corresponding trough side will be cut away at such places. The pulley 34 will be moved into register with the appropriate cut-out and the other cut-out places will be covered with trough-side segments of suitable length to enable their ends to overlap the inner surfaces of the trough side at opposite ends of such cut-outs, one of such segments being shown in dotted lines at 39.

Where the discharge conveyor is of considerable length, one of the crown pulleys 31 will be provided with the lubricating means with which the crown pulley 11 is provided, the belt will be provided with the studs 27, and the longitudinal central portion of the upper stretch of the belt will be supported by said studs upon the bar 26 in a manner similar to that shown in the preceding views, it being noted that the bar will be discontinuous where the dumping openings are provided. In order to accommodate these studs, the dumping pulley 34 will be provided with a groove 34a extending therearound with which the studs may register.

Having thus described my invention, what I claim is:

1. A conveying mechanism comprising, in combination, a pair of spaced end pulleys, an endless belt extending around the said pulleys and means for driving one of said pulleys, a backbone member located and supported between the said pulleys and extending longitudinally of and beneath the central portion of the upper stretch of said belt, and means operated by the travel of the said belt for supplying lubricant between the under surface of the upper stretch of said belt and the said backbone member.

2. A conveying mechanism comprising, in combination, a pair of spaced end pulleys, an endless belt extending around the said pulleys and means for driving one of said pulleys, a backbone member located and supported between the said pulleys and extending longitudinally of and beneath the central portion of the upper stretch of said belt, longitudinally spaced studs secured to the central portion of the said belt and adapted to engage the backbone member and support the central portion of the upper stretch of the belt thereon, and means for supplying lubricant to the portions of the studs which engage the backbone.

3. In the conveying mechanism recited in claim 2, the means for supplying lubricant to the backbone-engaging portions of the studs comprising a recess extending inwardly from the outer surface of one of said rollers and into which the said studs are adapted to project, and means for supplying lubricant to said recess.

4. A conveying mechanism comprising, in combination, a pair of spaced end pulleys, an endless belt extending around the said pulleys and means for driving one of said pulleys, a backbone member located and supported between the said pulleys and extending longitudinally of and beneath the central portion of the upper stretch of said belt, longitudinally spaced studs secured to the central portion of the said belt and adapted to engage the backbone member and support the central portion of the upper stretch of the belt thereon, and means for supplying lubricant to the portions of the studs which engage the backbone, said means comprising a recess projecting inwardly from the central portion of the exterior of one of said pulleys, a pad of absorbent material in said recess in a position to be engaged by the backbone-engaging portions of said studs, and means for supplying lubricant to the said pad.

5. In the conveying mechanism recited in claim 4, the recess in one of said pulleys extending around the central portion of said pulley and the pad also extending around the central portion of said pulley, and the means for supplying lubricant to the said pad comprising a bore extending axially of the pulley provided with the said recess and one or more bores extending from such axially extending bore to the said recess and to the pad therein, and a receptacle for lubricant communicating with the first mentioned bore.

6. A conveying mechanism comprising, in combination, a pair of spaced end pulleys, an endless belt extending around the said pulleys and means for driving one of said pulleys, a backbone member located and supported between the said pulleys and extending longitudinally of and beneath the upper stretch of said belt and spaced from the side edges thereof, and means operated by the travel of the said belt for supplying lubricant between the under surface of the upper stretch of said belt and the said backbone member.

7. A conveying mechanism comprising, in combination, a pair of spaced end pulleys, an endless belt extending around the said pulleys and means for driving one of said pulleys, a backbone member located and supported between the said pulleys and extending longitudinally of and beneath the upper stretch of said belt and spaced from the side edges thereof, longitudinally spaced studs secured to the said belt and adapted to engage the backbone member and support the corresponding portion of the upper stretch of the belt thereon, and means for supplying lubricant to the portions of the studs which engage the backbone, said means comprising a recess projecting inwardly from the exterior of one of said pulleys, a pad of absorbent material in said recess in a position to be engaged by the backbone-engaging portions of said studs, and means for supplying lubricant to the said pad.

CLAUD H. FOSTER.